(12) United States Patent
Shibahara et al.

(10) Patent No.: US 7,132,154 B2
(45) Date of Patent: Nov. 7, 2006

(54) TRANSPARENT COMPOSITE COMPOSITION

(75) Inventors: Sumio Shibahara, Tokyo (JP); Wataru Oka, Tokyo (JP)

(73) Assignee: Sumitomo Bakelite Co., Ltd, Tokyo (JP)

( * ) Notice: Subject to any disclaimer, the term of this patent is extended or adjusted under 35 U.S.C. 154(b) by 250 days.

(21) Appl. No.: 10/472,517

(22) PCT Filed: Jan. 22, 2003

(86) PCT No.: PCT/JP03/00503

§ 371 (c)(1),
(2), (4) Date: Sep. 24, 2003

(87) PCT Pub. No.: WO03/064530

PCT Pub. Date: Aug. 7, 2003

(65) Prior Publication Data

US 2004/0132867 A1    Jul. 8, 2004

(30) Foreign Application Priority Data

| Jan. 25, 2002 | (JP) | ............................ | 2002-017702 |
| Jan. 25, 2002 | (JP) | ............................ | 2002-017703 |
| Feb. 25, 2002 | (JP) | ............................ | 2002-048042 |
| May 10, 2002 | (JP) | ............................ | 2002-135952 |
| May 10, 2002 | (JP) | ............................ | 2002-136110 |
| Oct. 8, 2002 | (JP) | ............................ | 2002-295222 |

(51) Int. Cl.
*B32B 27/38* (2006.01)
*B32B 27/04* (2006.01)

(52) U.S. Cl. ................. 428/297.4; 428/413; 428/417

(58) Field of Classification Search ................ None
See application file for complete search history.

(56) References Cited

FOREIGN PATENT DOCUMENTS

| JP | 4-236217 | A | 8/1992 |
| JP | 6-25386 | A | 2/1994 |
| JP | 07-026121 | * | 1/1995 |
| JP | 2001-323135 | A | 11/2001 |
| JP | 2001-342325 | A | 12/2001 |
| JP | 2001-342326 | A | 12/2001 |
| JP | 2002-012743 | * | 1/2002 |
| JP | 2002-12743 | A | 1/2002 |
| JP | 2002-080698 | * | 3/2002 |
| JP | 2002-265568 | * | 9/2002 |

OTHER PUBLICATIONS

Machine translation of JP 07-026121, provided by the JPO website.*
Machine translation of JP 2002-080698, provided by the JPO website.*
Machine translation of JP 2001-323135, provided by the JPO website.*
Machine translation of JP 2002-012743, provided by the JPO website.*
Machine translation of JP 2002-265568, provided by the JPO website.*

* cited by examiner

*Primary Examiner*—Michael J. Feely
(74) *Attorney, Agent, or Firm*—Birch, Stewart, Kolasch & Birch, LLP

(57) ABSTRACT

A transparent composite composition is provided which comprises an epoxy resin (a) and a glass filler (b) and in which the epoxy resin (a) comprises at least one epoxy resin whose refractive index after curing is lower than the refractive index of the glass filler (b) and at least one epoxy resin whose refractive index after curing is higher than the refractive index of the glass filler (b). The transparent composite composition of the invention has a low coefficient of linear expansion and is excellent in transparency, heat resistance and solvent resistance, among others and, therefore, is judiciously used, for example, in the form of liquid crystal display device substrates and organic EL device substrates (in particular of the active matrix type) and, further, transparent sheets, optical lenses, color filter substrates, solar cell substrates, touch panels, optical devices, optical waveguides, LED sealing materials and so forth.

12 Claims, No Drawings

TRANSPARENT COMPOSITE COMPOSITION

This application is the national phase under 35 U.S.C. § 371 of PCT International Application No. PCT/JP03/00503 which has an International filing date of Jan. 22, 2003, which designated the United States of America.

TECHNICAL FIELD

The present invention relates to a transparent composite composition which is low in coefficient of linear expansion, is excellent in transparency, heat resistance and solvent resistance and can serve as a substitute for glass. This transparent composite composition can judiciously be used in producing liquid crystal display panel substrates, organic EL (electroluminescent) display device substrates, color filter substrates, touch panel substrates, solar cell substrates and like optical sheets, transparent sheets, optical lenses, optical devices, optical waveguides, LED (light-emitting diode) sealing materials, and so forth.

BACKGROUND ART

Those display panel or device substrates (in particular of the active matrix type) for use in liquid crystal display devices and organic EL display devices, color filter substrates, solar cell substrates and the like which are made of glass are generally in wide use. In recent years, however, for the reasons that glass sheets are breakable, inflexible, high in specific gravity and unsuited to weight reduction, various plastics materials have been investigated as substitutes therefor. For example, Laid-open Japanese Patent Application (JP Kokai) H06-337408 and JP Kokai H07-120740 describe transparent resin substrates for liquid crystal display devices as made of curing products obtained by curing an epoxy resin composition comprising an epoxy resin, an acid anhydride type curing agent and a curing catalyst. However, these prior art plastics materials as substitutes for glass are high in coefficient of linear expansion as compared with glass sheets and, when used as active matrix display device substrates, in particular, they may cause such problems as warping and aluminum wiring breaking in the production process and, accordingly, it is difficult to apply them to such fields of use. Thus, plastics materials satisfying the transparency, solvent resistance, liquid crystal resistance and heat resistance requirements, among others, imposed on display device substrates, in particular active matrix display device substrates and, at the same time, showing a small coefficient of linear expansion are demanded.

For reducing the coefficient of linear expansion, attempts have been made in the art to produce composite materials by incorporating an inorganic filler, such as a glass powder or glass fiber, in resins. In the case of such resin-inorganic filler composite materials, however, the transparency of the substrates is often impaired. The main cause is the difference in refractive index between the inorganic filler and resin, which causes diffused refraction of the light passing through the resin.

To solve such problems, various investigations have already been made to attain transparency by matching the refractive index of the resin with that of the inorganic filler. Various epoxy resin compositions rendered transparent by refractive index matching for use in photosemiconductor devices have been reported. For example, JP Kokai H04-236217 discloses a light-transmitting epoxy resin composition comprising an acid anhydride-cured epoxy resin and a filler substantially identical in refractive index to the resin. However, the fillers used in the prior art photosemiconductor device materials are special ones given a controlled refractive index by adjusting the silica-titania composition. Accordingly, it is demanded that technologies be developed for providing such resin compositions usable in a wider range of application fields by utilizing general-purpose glass fillers.

DISCLOSURE OF THE INVENTION

It is an object of the present invention to provide a transparent composite composition low in coefficient of linear expansion, excellent in transparency, heat resistance and solvent resistance and capable of serving as a substitute for glass. The composite composition of the invention is judiciously used in such fields of application as liquid crystal display device substrates, inclusive of active matrix type ones, organic EL display device substrates, color filter substrates, touch panel substrates, solar cell substrates and like optical sheets, transparent sheets, optical lenses, optical devices, optical waveguides, and LED sealing materials.

The present inventors made intensive investigations in an attempt to solve such problems. As a result, they found that a transparent composite composition comprising a glass filler (b) and an epoxy resin (a) which comprises at least one epoxy resin lower in refractive index after curing than the glass filler (b) and at least one epoxy resin higher in refractive index after curing than the glass filler (b), with the difference in refractive index between (a) and (b) being not more than 0.01, is highly transparent, as evidenced by a light transmissivity at the wavelength 550 nm of not less than 80%, and, in addition, is low in coefficient of linear expansion and is excellent in heat resistance and solvent resistance as well. This and other findings have now led to completion of the present invention.

Thus, the present invention provides a transparent composite composition comprising an epoxy resin (a) and a glass filler (b) and showing a light transmissivity at the wavelength 550 nm of not less than 80%.

In a preferred transparent composite composition according to the invention, the difference in refractive index between the epoxy resin (a) after curing and the glass filler (b) is not more than 0.01.

DETAILED DESCRIPTION OF THE INVENTION

The epoxy resin (a) to be used in the transparent composite composition of the invention is highly transparent to the visible light and, when it is molded into a sheet with a thickness of 200 μm, the light transmissivity thereof at the wavelength 550 nm is preferably not less than 80%, more preferably not less than 85%, most preferably not less than 88%. A transmissivity at the wavelength 550 nm of less than 80% will unfavorably result in deteriorations in performance characteristics of plastics substrates.

The epoxy resin (a) to be used in the practice of the invention is not particularly restricted but may be any of those which can be used in combination with the glass filler (b) to give composites showing a light transmissivity at the wavelength 550 nm of not less than 80%.

The epoxy resin (a) to be used in the practice of the invention preferably has, after curing, a glass transition temperature of not lower than 150° C., more preferably not lower than 180° C., still more preferably not lower than 200° C. If the glass transition temperature of the resin is lower than 150° C., deformation or warping will possibly occur in the process of TFT device formation, in particular in the process of TFT device formation on active matrix type display device substrates.

For use in optical fields such as plastics substrates for liquid crystal display devices, the transparent composite composition of the invention preferably has a light transmissivity at the wavelength 550 nm of not less than 80%, more preferably not less than 85%. When the light transmissivity is lower than such level, the light utilization efficiency will lower, and this is unfavorable in those fields where much importance is attached to the light efficiency.

For providing such composite composition with a light transmissivity at the 550 nm of not less than 80%, (1) the method comprising equalizing the refractive index of the epoxy resin with that of the glass filler or (2) the method comprising using, as the glass filler, a fine one not larger than the wavelength of the light may be employed. In view of the ready material availability, however, the method involving refractive index matching is preferred.

For maintaining good transparency, the difference in refractive index between the epoxy resin (a) and glass filler (b) is preferably not more than 0.01, more preferably not more than 0.005. When such difference in refractive index is greater than 0.01, the resulting plastics substrates tend to be poor in transparency.

The method employable for attaining a difference in refractive index between the epoxy resin (a) and glass filler (b) of not more than 0.01 may comprise, for example, (1) selecting, as the resin, one differing in refractive index by not more than 0.01 from the glass filler, (2) adjusting the refractive index of the glass filler to match the same with the refractive index of the resin, or (3) adjusting the refractive index of the resin to match the same with the refractive index of the glass filler.

However, since it is not easy to select an adequate resin-glass filler combination realizing a difference in refractive index of not more than 0.01 while satisfying various characteristics requirements imposed on display device substrates, it is preferred that the refractive index of the resin or glass filler be adjusted so as to make the difference in refractive index not more than 0.01. In cases where the refractive index of the glass filler is adjusted to match with the refractive index of the resin, the use of a special glass filler is required. From the cost viewpoint, therefore, the method comprising adjusting the refractive index of the resin to match it with the refractive index of the filler is preferred.

Available for matching the refractive index of the resin with that of the glass filler are, among others, (1) the method comprising combinedly using two or more resins differing in refractive index, and (2) the method comprising adding an additive higher or lower in refractive index than the resin. Preferred among them is the method comprising combinedly using a resin higher in refractive index than the filler and a resin lower in refractive index than the glass filler to thereby adjust the refractive index in question. By this method, it is relatively easy to match the refractive index of the resin with the refractive indices of general-purpose glasses, such as E glass, S glass and NE glass.

The combination of epoxy resins differing in refractive index is not particularly restricted but may be any of the combinations capable of giving a refractive index matched with that of the glass filler (B), for example (1) the combination of two or more epoxy resins differing in refractive index, (2) the combination of two or more curing agents differing in refractive index, and (3) the combination of an epoxy resin and another resin differing in refractive index from the epoxy resin. However, the combination of two or more epoxy resins differing in refractive index is preferred since the resins are highly compatible with each other and the refractive index can be adjusted within a broad range.

Thus, preferred as the combination of resins by which the refractive index can be adjusted to that of the glass filler (b) is the combination of at least one epoxy resin lower in refractive index upon curing than the glass filler (b) and at least one epoxy resin higher in refractive index upon curing than the glass filler (b).

The refractive index of an epoxy resin after curing may also vary depending on the curing agent used, and the epoxy resin having a lower refractive index and the epoxy having a higher refractive index are not particularly restricted provided that the refractive indices after curing are respectively lower and higher than the refractive index of the glass filler employed.

When a glass filler having a refractive index of 1.52 or higher, for example an E glass or S glass filler, is used as the glass filler, the following combination is preferred, among others:

(i) at least one epoxy resin selected from among alicyclic epoxy resins relative low in refractive index (e.g. those of the formulas (3) to (8) given below) and triglycidyl isocyanurate (of the formula (9) given below), which is medium in refractive index, and (ii) at least one epoxy resin selected from among sulfurcontaining epoxy resins relative high in refractive index (e.g. those of the formula (1) given below) and fluorene skeleton-containing epoxy resins (of the formula (2) given below), with an acid anhydride as the curing agent. Among the abovementioned components (i), triglycidyl isocyanurate is preferred from the heat resistance viewpoint.

When, on the other hand, a glass filler lower in refractive index than 1.52, for example an NE glass filler, is used, the following combination is preferred, among others:

(i) at least one epoxy resin selected from among alicyclic epoxy resins relatively low in refractive index (e.g. those of the formulas (3) to (8) given below) and (ii) at least one epoxy resin selected from among triglycidyl isocyanurate (of the formula (9) given below), which is medium in refractive index, and sulfur-containing epoxy resins (of the formula (1) given below) and fluorene skeleton-containing epoxy resins (of the formula (2) given below), which are relatively high in refractive index, with an acid anhydride as the curing agent.

As the above-mentioned epoxy resin relatively low in refractive index, there may be mentioned alicyclic epoxy resins represented by the following formulas (3) to (8):

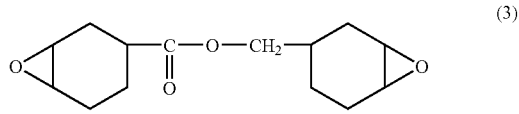

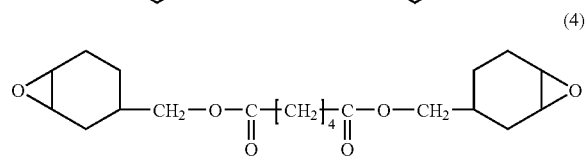

-continued

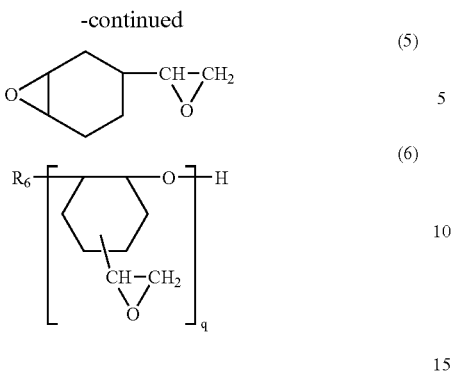
(5)

(6)

(In the formula, $R_6$ represents an alkyl group or a trimethylolpropane residue, and q is 1 to 20.)

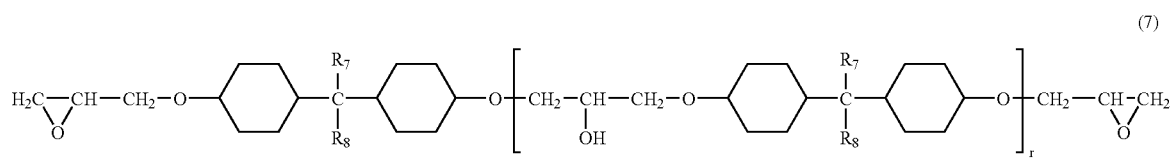
(7)

(In the formula, $R_7$ and $R_8$ each independently represents a hydrogen atom or a methyl group, and r is 0 to 2.)

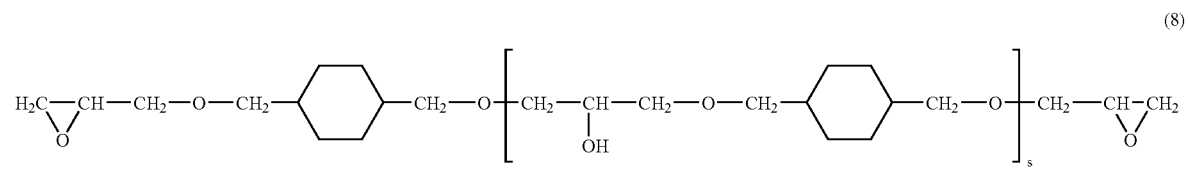
(8)

(In the formula, s is 0 to 2.)

The above-mentioned triglycidyl isocyanurate, which is medium in refractive index, is represented by the following formula (9):

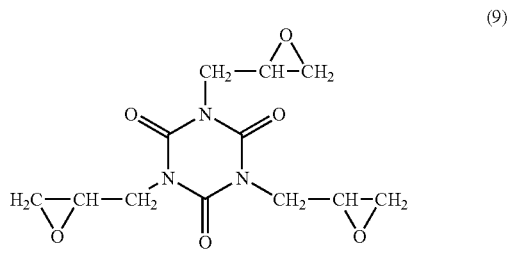
(9)

The above-mentioned sulfur-containing epoxy resins and fluorene skeleton-containing epoxy resins, which are relatively high in refractive index, are represented by the following formulas (1) and (2), respectively.

Sulfur-containing Epoxy Resin

The sulfur-containing epoxy resin is not particularly restricted but may be any of those sulfur-containing epoxy resins which have two or more epoxy groups. From the heat resistance and transparency viewpoint, epoxy resins represented by the following formula (1) are preferred:

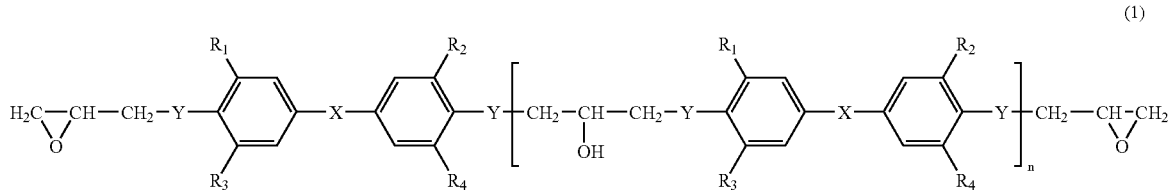

wherein X represents S or $SO_2$, Y represents O or S, $R_1$ to $R_4$ each independently represents a hydrogen atom or a methyl group, n is 0 to 2.

Among the epoxy resins of formula (1), a bisphenol S derivative having a structure such that X is $SO_2$, Y is oxygen, $R_5$ to $R_{10}$ each is hydrogen and n is 0 or 1 is most preferred from the reactivity, heat resistance and easy handleability viewpoint.

Fluorene Skeleton-containing Epoxy Resin

The fluorene skeleton-containing epoxy resin is not particularly restricted but may be any of those fluorene skeleton-containing epoxy resins which have two or more epoxy groups. From the heat resistance and transparency viewpoint, however, epoxy resins represented by the following formula (2) are preferred:

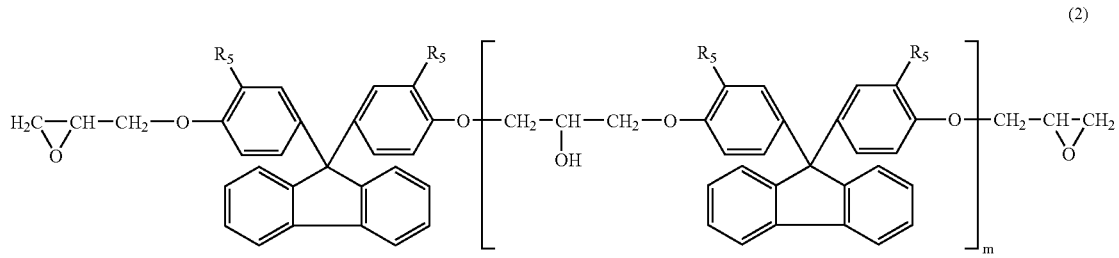

wherein $R_5$ represents a hydrogen atom or a methyl group and m is 0 to 2.

The epoxy resins differing in refractive index after curing may be mixed and cured together in an adequate proportion according to the desired refractive index and, thus, the refractive index of the epoxy resin (a) can be adjusted according to the refractive index of the glass filler.

A monofunctional epoxy compound may be combinedly used in the epoxy resin to be used in the practice of the invention for providing flexibility, for instance, at an addition level within the range within which the desired characteristics will not be impaired. In this case, the addition level is adjusted so that the refractive index of the whole resin may match with the refractive index of the glass filler.

In the practice of the invention, the epoxy resin (a) is cured by heating or actinic irradiation in the presence of a curing agent or a polymerization initiator. The curing agent is not particularly restricted but preferably is an acid anhydride type curing agent or a cationic catalyst because of the ease of obtaining curing products excellent in transparency.

The acid anhydride type curing agent includes, among others, phthalic anhydride, maleic anhydride, trimellitic anhydride, pyromellitic anhydride, hexahydrophthalic anhydride, tetrahydrophthalic anhydride, methylnadic anhydride, nadic anhydride, glutaric anhydride, methylhexahydrophthalic anhydride, methyltetrahydrophthalic anhydride, hydrogenated methylnadic anhydride, hydrogenated nadic anhydride, and the like. Among these, methylhexahydrophthalic anhydride and hydrogenated methylnadic anhydride are preferred from the excellent transparency viewpoint.

In cases where such acid anhydride type curing agent is used, a curing promoter is preferably used. As the curing promoter, there may be mentioned, among others, tertiary amines such as 1,8-diazabicyclo[5.4.0]undecene-7 and triethylenediamine, imidazoles such as 2-ethyl-4-methylimidazole, phosphorus compounds such as triphenylphosphine and tetraphenylphosphonium tetraphenylborate, quaternary ammonium salts, organic metal salts, and derivatives of these. Among them, phosphorus compounds are preferred.

These curing promoters may be used singly or two or more of them may be used in combination.

The acid anhydride type curing agent is preferably used in an amount such that the acid anhydride group in the acid anhydride type curing agent may amount to 0.5 to 1.5 equivalents, more preferably 0.7 to 1.2 equivalents, per equivalent of the epoxy group in the epoxy resin (a).

The cationic catalyst include, among others, organic acids such as acetic acid, benzoic acid, salicylic acid and para-toluenesulfonic acid, boron trifluoride-amine complexes, boron trifluoride ammonium salt, aromatic diazonium salts, aromatic sulfonium salts, aromatic iodonium salts, aluminum complex-containing cationic catalysts, and the like. Among them, aluminum complex-containing cationic catalysts are preferred.

(Glass Filler)

The refractive index of the glass filler (b) is not particularly restricted but is preferably within the range of 1.50 to 1.57 so that the refractive index of the epoxy resin may be adjusted with ease. In particular when the refractive index of the glass filler is 1.50 to 1.54, it is favorably possible to select an epoxy resin close in Abbe number to the glass filler. When the resin and glass are close in Abbe number to each other, the refractive indexes of both can agree in a wide wavelength range and a high light transmissivity can be obtained in the wide wavelength range.

The glass filler (b) to be used in the practice of the invention includes glass fibers, glass cloths, nonwoven glass fabrics and other glass fiber cloths, glass beads, glass flakes, glass powders, milled glass species and so forth. Among them, glass fibers, glass cloths and nonwoven glass fabrics are preferred in view of their being highly effective in reducing the coefficient of linear expansion. Glass cloths are most preferred.

As for the glass species, there may be mentioned E glass, C glass, A glass, S glass, D glass, NE glass, T glass, quartz, low permittivity glass, high permittivity glass and so forth. Preferred among them are E glass, S glass, T glass and NE glass, which are poor in ionic impurities such as alkali metals and readily available.

The glass filler (b) is incorporated preferably in an amount of 1 to 90% by weight, more preferably 10 to 80% by weight, still more preferably 30 to 70% by weight. When the content of the glass filler is within such range, the linear expansion reducing effect owing to the composite formulation can be observed.

The closer the contact between the glass filler and resin in the composite composition of the invention is, the better the transparency of the composite composition, for example in the form of plastics substrates for display devices, is. Therefore, the glass filler surface is preferably treated with a surface modifier known in the art, for example a silane coupling agent. More specifically, the surface is preferably treated with an epoxy group-containing silane compound.

In the composite composition of the invention in the form of plastics substrates for display devices, there may be incorporated, where necessary, a thermoplastic or thermosetting oligomer or polymer may be used combinedly within an addition level range within which the transparency, solvent resistance, heat resistance and other characteristics will not be impaired. In such case, an oligomer or polymer having an alicyclic structure or cardo skeleton is preferably used for the purpose of reducing the water absorbency, for instance. When such thermoplastic or thermosetting oligomer or polymer is combinedly used, it is necessary to adjust the composition of the mixture so that the refractive index of the whole may match with the refractive index of the glass filler.

The composite composition of the invention may further contain, according to need, an antioxidant, an ultraviolet absorber, a dye or pigment, a loading material such as another inorganic filler, and/or a further additive, each in a small amount so that such characteristics as transparency, solvent resistance and heat resistance may not be impaired.

The method of molding the composite composition is not particularly restricted but may be, for example, the one comprising directly mixing up the epoxy resin and glass filler, casting the blend in a mold as required and then curing the same to give a sheet, the one comprising dissolving the epoxy resin in a solvent, dispersing the glass filler in the solution and casting the dispersion, followed by curing to give a sheet, or the one comprising impregnating a glass cloth or nonwoven glass fiber with the epoxy resin, followed by curing to give a sheet.

In cases where the composite composition of the invention is used in the optical fields such as plastics substrates for liquid crystal display devices, color filter substrates, plastics substrates for organic LE display devices, solar panel substrates, and touch panels, the substrate thickness is preferably 50 to 2,000 μm, more preferably 50 to 1,000 μm. When the substrate thickness is within this range, the substrates are excellent in flatness and can be lightweight as compared with the corresponding glass substrates.

In cases where this transparent composite composition of the invention is used in the above-mentioned optical fields, it is preferred that the products have an average coefficient of linear expansion, at 30–150° C., of not more than 40 ppm, more preferably not more than 30 ppm, most preferably not more than 20 ppm. In cases where this composite composition is intended for use as active matrix type display device substrates, for instance, a linear expansion coefficient exceeding the above upper limit value may possibly cause such problems as warping and aluminum wiring breakage in the process of production of the substrates.

For use as plastics substrates for display devices, the sheets may be provided with a coat layer made of a resin on both sides for improvement in smoothness. Such coat resin is preferably one having good transparency, heat resistance and chemical resistance, specifically a polyfunctional acrylate or epoxy resin, for instance. The coat layer preferably has a thickness of 0.1 to 50 μm, more preferably 0.5 to 30 μm.

The plastics substrates for display devices of the invention may be provided with a gas barrier layer against water vapor and oxygen and/or a transparent electrode layer according to need.

EXAMPLES

The following examples illustrate the present invention in more detail. They are, however, by no means limitative of the scope of the invention.

Example 1

A glass cloth made of S glass (thickness 100 μm, refractive index 1.530, product of Unitika Glass fiber, #2117 type) was deprived of organic matter by burning and then treated with γ-glycidoxypropyltrimethoxysilane (epoxysilane). This glass cloth was impregnated with a resin prepared by melt blending, at 110° C., 90 parts by weight of triglycidyl isocyanurate (TEPIC, product of Nissan Chemical Industries), 10 parts by weight of a bisphenol S-based epoxy resin (Epiclon EXA 1514, product of Dainippon Ink and Chemicals), 170 parts by weight of hydrogenated methylnadic anhydride (Rikacid HNA-100, product of New Japan Chemical) and 2 parts by weight of tetraphenyiphosphonium bromide (TPP-PB, product of Hokko Chemical Industry), and the impregnated cloth was degassed. This glass cloth was sandwiched between release agent-treated glass sheets, and heated in an oven at 100° C. for 2 hours and, further successively, at 120° C. for 2 hours, at 150° C. for 2 hours, at 175° C. for 2 hours, to give a transparent sheet having a thickness of 0.1 mm.

Example 2

An S glass-based glass cloth treated in the same manner as in Example 1 was impregnated with a resin prepared by melt blending, at 110° C., 62.5 parts by weight of triglycidyl isocyanurate (TEPIC, product of Nissan Chemical Industries), 27.5 parts by weight of a bisphenol S-based epoxy resin (Epiclon EXA 1514, product of Dainippon Ink and Chemicals), 120 parts by weight of methylhexahydrophthalic anhydride (Rikacid MH-700, product of New Japan Chemical) and 1.4 parts by weight of tetra-phenylphosphonium bromide (TPP-PB, product of Hokko Chemical Industry), and the impregnated cloth was degassed. This glass cloth was sandwiched between release agent-treated glass sheets, and subjected to heat treatment in an oven under the same conditions as in Example 1 to give a transparent sheet having a thickness of 0.1 mm.

Example 3

An E glass-based glass cloth (thickness 100 μm, refractive index 1.560, product of Unitika Glass fiber, #2117 type) was deprived of organic matter by burning and then treated with γ-glycidoxypropyltrimethoxysilane (epoxysilane). This glass cloth was impregnated with a resin prepared by melt blending, at 100° C., 20 parts by weight of triglycidyl isocyanurate (TEPIC, product of Nissan Chemical Industries), 80 parts by weight of a bisphenol S-based epoxy resin (Epiclon EXA 1514, product of Dainippon Ink and Chemicals), 75 parts by weight of hydrogenated methylnadic anhydride (Rikacid HNA-100, product of New Japan Chemical) and 1 part by weight of tetraphenylphosphonium bromide (TPP-PB, product of Hokko Chemical Industry), and the impregnated cloth was degassed. This glass cloth was sandwiched between release agent-treated glass sheets, and subjected to heat treatment in an oven under the same conditions as in Example 1 to give a transparent sheet having a thickness of 0.1 mm.

Example 4

An E glass-based glass cloth (thickness 100 μm, refractive index 1.560, product of Unitika Glass fiber (#2117 type)) was deprived of organic matter by burning and then treated with γ-glycidoxypropyltrimethoxysilane (epoxysilane). This glass cloth was impregnated with a resin prepared by melt blending, at 100° C., 45.5 parts by weight of triglycidyl isocyanurate (TEPIC, product of Nissan Chemical Industries), 54.5 parts by weight of a fluorene skeleton-containing epoxy resin (BPFG, product of Nagase Chemtex), 113 parts by weight of hydrogenated methylnadic anhydride (Rikacid HNA-100, product of New Japan Chemical) and 1.3 parts by weight of tetraphenylphosphonium bromide (TPP-PB, product of Hokko Chemical Industry), and the impregnated cloth was degassed. This resin-impregnated glass cloth was sandwiched between release agent-treated glass sheets, and subjected to heat treatment in an oven under the same conditions as in Example 1 to give a transparent sheet having a thickness of 0.1 mm.

Example 5

An NE glass-based glass cloth (thickness 100 μm, refractive index 1.510, product of Nittobo) was deprived of organic matter by burning and then treated with γ-glycidoxypropyltrimethoxysilane (epoxysilane). This glass cloth was impregnated with a resin prepared by melt blending, at 100° C., 40 parts by weight of triglycidyl isocyanurate (TEPIC, product of Nissan Chemical Industries), 60 parts by weight of an alicyclic epoxy resin (formula 3) (Celloxide 2021 product of Daicel Chemical Industries), 139 parts by weight of hydrogenated methylnadic anhydride (Rikacid HNA-100, product of New Japan Chemical) and 1 part by weight of 1-benzyl-2-phenylimidazole (1B2PZ)), and the impregnated cloth was degassed. This resin-impregnated glass cloth was sandwiched between release agent-treated glass sheets, and subjected to heat treatment in an oven under the same conditions as in Example 1 to give a transparent sheet having a thickness of 0.1 mm.

Example 6

An NE glass-based glass cloth treated in the same manner as in Example 5 was impregnated with a resin prepared by melt blending, at 100° C., 80 parts by weight of an alicyclic epoxy resin (formula 6) (EHPE 3150, product of Daicel Chemical Industries), 20 parts by weight of a bisphenol S-based epoxy resin (Epiclon EXA 1514, product of Dainippon Ink and Chemicals), 77 parts by weight of methylhexahydrophthalic anhydride (Rikacid MH-700, product of New Japan Chemical) and 1 part by weight of 1-benzyl-2-phenylimidazole (1B2PZ), and the impregnated cloth was degassed. This resin-impregnated glass cloth was sandwiched between release agent-treated glass sheets, and subjected to heat treatment in an oven under the same conditions as in Example 1 to give a transparent sheet having a thickness of 0.1 mm.

Comparative Example 1

An alicyclic epoxy resin (formula 3) (100 parts by weight; Celloxide 2021, product of Daicel Chemical Industries), 81 parts by weight of methylhexahydrophthalic anhydride (Rikacid MH-700, product of New Japan Chemical) and 1 part by weight of tetraphenylphosphonium bromide (TPP-PB, product of Hokko Chemical Industry) were melt blended at 50° C. This resin was sandwiched between release agent-treated glass sheets and subjected to heat treatment in an oven under the same conditions as in Example 1 to give a transparent resin sheet having a thickness of 0.2 mm.

Comparative Example 2

An E glass-based glass cloth treated in the same manner as in Example 3 was impregnated with a resin prepared by melt blending, at 50° C., 100 parts by weight of an alicyclic epoxy resin (formula 3) (Celloxide 2021, product of Daicel Chemical Industries), 81 parts by weight of methylhexahydrophthalic anhydride (Rikacid MH-700, product of New Japan Chemical) and 1 part by weight of tetraphenylphosphonium bromide (TPP-PB, product of Hokko Chemical Industry), and the impregnated cloth was degassed. This glass cloth was sandwiched between release agent-treated glass sheets, and subjected to heat treatment in an oven under the same conditions as in Example 1 to give a resin sheet having a thickness of 0.1 mm.

(Methods of Evaluation)

The resin sheets (plastics substrates for display devices) produced in the above examples and comparative examples were measured for various characteristics by the following evaluation methods.

(a) Average Linear Expansion Coefficient

The coefficient was determined by carrying out measurements in a nitrogen atmosphere using a Seiko instruments model TMA/SS120C thermal stress strain measuring apparatus within the range of 30° C. to 150° C. while raising the temperature at a rate of 5° C. per minute after once raising the temperature from 30° C. to 150° C. at a rate of 5° C. per minute and then cooled to 0° C. Measurements were made in the tensile mode under a load of 5 g.

For the measurements, originally designed tension chucks (material: quartz, coefficient of linear expansion 0.5 ppm) were used. The Inconel-made chucks in general use have problems, namely they are themselves high in coefficient of linear expansion and unsatisfactory with respect to the mode of supporting samples and, thus, when they are applied to sheets having a thickness exceeding 100 μm, greater linear expansion coefficient values are obtained as compared with the results of measurement in the compression mode and the variation becomes greater. Therefore, the quartz-made tension chucks were originally designed and used in linear expansion coefficient measurements. It has been confirmed that when these tension chucks are used, almost the same values can be measured as in the compression mode.

(b) Heat Resistance (Tg)

Measurements were made on a Seiko instruments model DMS-210 viscoelasticity measuring apparatus. The maximum value of tanδ at 1 Hz was recorded as the glass transition temperature (Tg).

(c) Solvent Resistance

Each specimen was immersed in dimethyl sulfoxide (DMSO) at 60° C. and allowed to stand therein for 60 minutes. After taking out the specimen, its appearance was checked by visual observation. When the shape and color were fully retained and there was no erosion, the appearance was evaluated as ○; otherwise, it was evaluated as X.

(d) Alignment Material Resistance

Each specimen was placed on a spin coater. CRD-8201 (product of Sumitomo Bakelite) was dropped onto the surface thereof, and spin coating was carried out at 2,500 rpm. After 60 minutes of drying at 180° C., the appearance was evaluated by visual observation.

(e) Liquid Crystal Resistance

On drop of Merck's ZIL-4792 was dropped onto the surface of each substrate specimen. The whole was placed in an oven at 80° C. and allowed to stand there for 60 minutes. After taking out the specimen, its appearance was evaluated by visual observation.

(f) Light Transmissivity

Light transmissions at 400 nm and 550 nm were measured on a spectrophotometer U3200 (product of Hitachi Ltd.).

(g) Refractive Index

The refractive index at the wavelength 589 nm was measured at 25° C. using an Atago model DR-M2 Abbe refractometer.

(h) Evaluation of Deformation Such as Warping and/or Flexure

A 3,000 Å-thick aluminum layer was formed on each substrate specimen by sputtering, a pseudo wiring pattern, 100 μm wide and 30 mm long, was formed by photolithography, and a 2,000 Å-thick gold layer was formed on each 5-mm end portion of the pattern by sputtering to form 5-mm$_2$ electrodes for resistance value measurement. Then, a metal mask having an opening of 10 mm$^2$ was disposed in the middle of the wiring pattern, and SiN (2,000 Å)/amorphous Si (500 Å)/SiN (2,000 Å) layers were formed by continuous CVD. Further, the whole was placed in an oven at 180° C. and, after 1 hour, allowed to cool to ordinary temperature, and the appearance was checked by visual observation.

The results of the evaluations of the samples obtained in the above-mentioned examples and comparative examples by these evaluation methods are shown below in Table 1 and Table 2.

TABLE 1

|  | Example 1 | Example 2 | Example 3 | Example 4 |
|---|---|---|---|---|
| Isocyanurate type EP | 90 | 62.5 | 20 | 45.5 |
| Bisphenol S-based EP | 10 | 27.5 | 80 | — |
| Fluorene skeleton-containing EP | — | — | — | 54.5 |
| Alicyclic epoxy resin (formula 3) | — | — | — | — |
| Acid anhydride (HNA-100) | 170 | — | 75 | 113 |
| Acid anhydride (MH-700) | — | 120 | — | — |
| Curing promoter (TPP-PB) | 2.0 | 1.4 | 1.0 | 1.3 |
| Curing promoter (1B2PZ) | — | — | — | — |
| S glass-based glass cloth | 100 μm × 1 sheet | 100 μm × 1 sheet | — | — |
| E glass-based glass cloth | — | — | 100 μm × 1 sheet | 100 μm × 1 sheet |
| NE glass-based glass cloth | — | — | — | — |
| Refractive index of resin | 1.529 | 1.527 | 1.561 | 1.562 |
| Refractive index of glass cloth | 1.530 | 1.530 | 1.560 | 1.560 |
| Substrate thickness (μm) | 100 | 100 | 100 | 100 |
| Filler content (% by weight) | 50 | 50 | 50 | 50 |
| Average linear expansion coefficient (ppm) | 12 | 11 | 16 | 14 |
| Heat resistance: Tg (° C.) | 283 | 234 | 221 | 230 |
| Solvent resistance | ○ | ○ | ○ | ○ |
| Alignment material resistance | ○ | ○ | ○ | ○ |
| Liquid crystal resistance | ○ | ○ | ○ | ○ |
| Light transimissivity (%) 400 nm | 87 | 86 | 65 | 61 |
| Light transimissivity (%) 550 nm | 89 | 89 | 88 | 89 |
| Warping/flexure | ○ | ○ | ○ | ○ |

TABLE 2

|  | Example 5 | Example 6 | Comparative Example 1 | Comparative Example 2 |
|---|---|---|---|---|
| Isocyanurate type EP | 40 | — | — | — |
| Bisphenol S-based EP | — | 20 | — | — |
| Fluorene skeleton-containing EP | — | — | — | — |
| Alicyclic epoxy resin (formula 3) | 60 | — | 100 | 100 |
| Alicyclic epoxy resin (formula 6) | — | 80 | — | — |
| Acid anhydride (HNA-100) | 139 | — | — | — |

TABLE 2-continued

| | Example 5 | Example 6 | Comparative Example 1 | Comparative Example 2 |
|---|---|---|---|---|
| Acid anhydride (MH-700) | — | 77 | 81 | 81 |
| Curing promoter (TPP-PB) | — | — | 1.0 | 1.0 |
| Curing promoter (1B2PZ) | 1.0 | 1.0 | — | — |
| S glass-based glass cloth | — | — | — | — |
| E glass-based glass cloth | — | — | — | 100 μm × 1 sheet |
| NE glass-based glass cloth | 100 μm × 1 sheet | 100 μm × 1 sheet | — | — |
| Refractive index of resin | 1.512 | 1.512 | 1.510 | 1.510 |
| Refractive index of glass cloth | 1.510 | 1.510 | — | 1.560 |
| Substrate thickness (μm) | 100 | 100 | 200 | 100 |
| Filler content (% by weight) | 50 | 50 | 0 | 50 |
| Average linear expansion coefficient (ppm) | 15 | 13 | 72 | 17 |
| Heat resistance: Tg (° C.) | 258 | 235 | 186 | 190 |
| Solvent resistance | ◯ | ◯ | ◯ | ◯ |
| Alignment material resistance | ◯ | ◯ | ◯ | ◯ |
| Liquid crystal resistance | ◯ | ◯ | ◯ | ◯ |
| Light transimissivity (%) 400 nm | 86 | 86 | 88 | 8 |
| Light transimissivity (%) 550 nm | 89 | 90 | 90 | 35 |
| Warping/flexure | ◯ | ◯ | X | ◯ |

INDUSTRIAL APPLICABILITY

The transparent composite composition of the invention has a low coefficient of linear expansion and is excellent in transparency, heat resistance and solvent resistance, among others and, therefore, is preferably used, for example, in the form of liquid crystal display device substrates and organic EL device substrates (in particular of the active matrix type) and, further, transparent sheets, optical lenses, color filter substrates, solar cell substrates, touch panels, optical devices, optical waveguides, LED sealing materials and so forth.

The invention claimed is:

1. A transparent composite composition which comprises an epoxy resin (a) and a glass filler (b) and shows a light transmissivity at a wavelength of 550 nm of not less than 80%,
a difference in refractive index between the epoxy resin (a) after curing and the glass filler (b) being not more than 0.01,
the glass filler (b) being a glass fiber, glass fiber cloth or nonwoven glass fabric.

2. The transparent composite composition according to claim 1, wherein the glass filler (b) has a refractive index of 1.50 to 1.57.

3. The transparent composite composition according to claim 1, wherein the epoxy resin (a) after curing has a glass transition temperature of not lower than 150° C.

4. The transparent composite composition according to claim 1, wherein the epoxy resin (a) comprises at least one epoxy resin whose refractive index after curing is lower than the refractive index of the glass filler (b) and at least one epoxy resin whose refractive index after curing is higher than the refractive index of the glass filler (b).

5. The transparent resin composite composition according to claim 4, wherein the glass filler (b) has a refractive index of not less than 1.52 and wherein the epoxy resin whose refractive index after curing is lower than the refractive index of the glass filler comprises at least one epoxy resin selected from among alicyclic epoxy resins and triglycidyl isocyanurate and the epoxy resin whose refractive index after curing is higher than the refractive index of the glass filler comprises at least one epoxy resin selected from among sulfur-containing epoxy resins and fluorene skeleton-containing epoxy resins.

6. The transparent composite composition according to claim 4, wherein the glass filler (b) has a refractive index of less than 1.52 and wherein the epoxy resin whose refractive index after curing is lower than the refractive index of the glass filler comprises at least one epoxy resin selected from among alicyclic epoxy resins and the epoxy resin whose refractive index after curing is higher than the refractive index of the glass filler comprises at least one epoxy resin selected from among triglycidyl isocyanurate, sulfur-containing epoxy resins and fluorene skeleton-containing epoxy resins.

7. The transparent composite composition according to claim 5 or 6, wherein the sulfur-containing epoxy resin is a compound represented by the following formula (1):

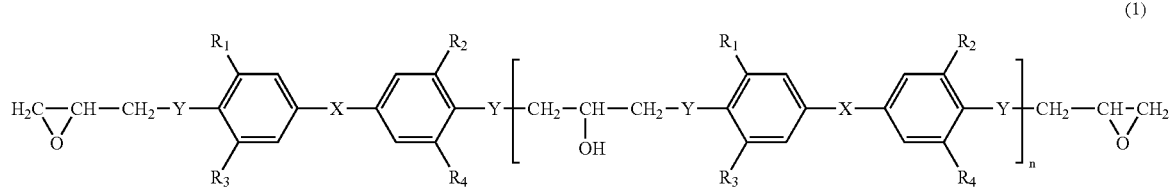

(1)

wherein X represents S or $SO_2$, Y represents O or S, $R_1$ to $R_4$ each independently represents a hydrogen atom or a methyl group and n is 0 to 2.

8. The transparent composite composition according to claim 5 or 6, wherein the fluorene skeleton-containing epoxy resin is represented by the following formula (2):

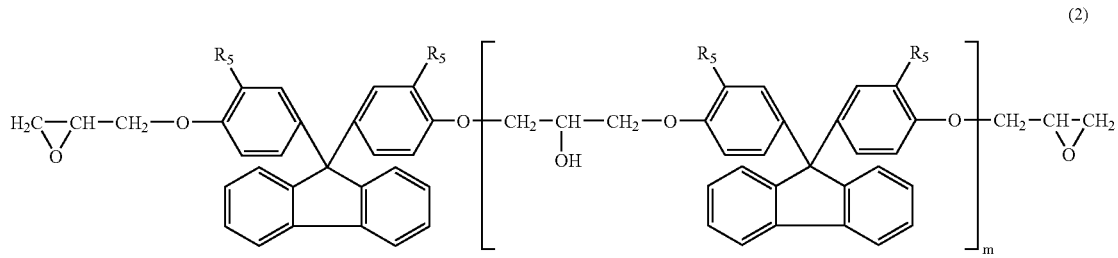

wherein $R_5$ represents a hydrogen atom or a methyl group and m is 0 or 2.

9. The transparent composite composition according to claim 1, wherein the epoxy resin (a) is the product of curing using an acid anhydride type curing agent or a cationic catalyst.

10. The transparent composite composition according to claim 1, which has an average linear expansion coefficient of not more than 40 ppm within the temperature range of 30 to 150° C.

11. The transparent composite composition according to claim 1, which occurs as a sheet having a thickness of 50 to 2,000 μm.

12. The transparent composite composition according to claim 1, which occurs as an optical sheet, display device plastic substrate, or active matrix type display device substrate.

* * * * *